United States Patent
Minnear et al.

(10) Patent No.: US 10,161,310 B2
(45) Date of Patent: Dec. 25, 2018

(54) HYDROCARBON FILM PROTECTED REFRACTORY CARBIDE COMPONENTS AND USE

(71) Applicant: GENERAL ELECTRIC COMPANY, Schenectady, NY (US)

(72) Inventors: William Paul Minnear, Clifton Park, NY (US); Ronald Scott Bunker, West Chester, OH (US); Narendra Digamber Joshi, Schenectady, NY (US); Andrei Tristan Evulet, Mason, OH (US)

(73) Assignee: General Electric Company, Schenectady, NY (US)

( * ) Notice: Subject to any disclaimer, the term of this patent is extended or adjusted under 35 U.S.C. 154(b) by 353 days.

(21) Appl. No.: 15/012,173

(22) Filed: Feb. 1, 2016

(65) Prior Publication Data

US 2016/0208700 A1     Jul. 21, 2016

Related U.S. Application Data

(62) Division of application No. 13/328,704, filed on Dec. 16, 2011, now Pat. No. 9,284,231.

(51) Int. Cl.

| | | |
|---|---|---|
| *F02C 1/00* | (2006.01) |
| *F02C 7/16* | (2006.01) |
| *C04B 41/00* | (2006.01) |
| *C04B 41/80* | (2006.01) |
| *F01D 25/12* | (2006.01) |
| *F02C 7/12* | (2006.01) |
| *F01D 15/10* | (2006.01) |

(52) U.S. Cl.
CPC .............. *F02C 7/16* (2013.01); *C04B 41/009* (2013.01); *C04B 41/0072* (2013.01); *C04B 41/80* (2013.01); *F01D 15/10* (2013.01); *F01D 25/12* (2013.01); *F02C 7/12* (2013.01); *F05D 2260/232* (2013.01); *Y02T 50/672* (2013.01); *Y02T 50/676* (2013.01)

(58) Field of Classification Search
CPC .............. F02C 3/34; F02C 1/08; F02C 1/005
See application file for complete search history.

(56) References Cited

U.S. PATENT DOCUMENTS

| | | |
|---|---|---|
| 3,785,145 A | 1/1974 | Amann |
| 3,966,353 A | 6/1976 | Booher, Jr. et al. |

(Continued)

FOREIGN PATENT DOCUMENTS

| | | |
|---|---|---|
| CN | 1609426 A | 4/2005 |
| JP | 1999072009 A | 3/1999 |

(Continued)

OTHER PUBLICATIONS

H. Huang et al., Fuel-Cooled Thermal Management for Advanced Aeroengines, Journal of Engineering for Gas Turbines and Power, vol. 126, No. 2, pp. 284-293, Apr. 2004.

(Continued)

*Primary Examiner* — Gerald L Sung

(57) ABSTRACT

A turbine power generation system with enhanced stabilization of refractory carbides provided by hydrocarbon from high carbon activity gases is disclosed. The disclosure also includes a method of using high carbon activity gases to stabilize hot gas path components.

19 Claims, 3 Drawing Sheets

(56) References Cited

U.S. PATENT DOCUMENTS

| | | | |
|---|---|---|---|
| 4,109,050 | A | 8/1978 | Mehan et al. |
| 5,431,007 | A | 7/1995 | Viscovich et al. |
| 6,014,855 | A | 1/2000 | Page |
| 7,036,316 | B2 | 5/2006 | Howell et al. |
| 7,266,940 | B2 | 9/2007 | Balan et al. |
| 7,658,076 | B2 | 2/2010 | Hoffmann |
| 7,908,867 | B2 | 3/2011 | Keller et al. |
| 7,980,052 | B1 | 7/2011 | Paulino |
| 2006/0112696 | A1* | 6/2006 | Lynghjem .............. B01D 53/62 60/772 |
| 2008/0078181 | A1 | 4/2008 | Mueller et al. |
| 2008/0078182 | A1 | 4/2008 | Evulet |
| 2008/0104938 | A1 | 5/2008 | Finkenrath et al. |
| 2008/0134685 | A1 | 6/2008 | Bunker et al. |
| 2009/0218821 | A1 | 9/2009 | Elkady et al. |
| 2010/0092280 | A1 | 4/2010 | Draper |
| 2010/0247292 | A1 | 9/2010 | Davis, Jr. et al. |
| 2011/0289929 | A1 | 12/2011 | Khan et al. |
| 2011/0314815 | A1* | 12/2011 | Li ........................ F01K 23/105 60/645 |

FOREIGN PATENT DOCUMENTS

| | | |
|---|---|---|
| JP | 2000204965 A | 7/2000 |
| JP | 2011247263 A | 12/2011 |

OTHER PUBLICATIONS

W. Bao et al., "Midelling and Simulation Methodology of Channel Cooling using Hydrocarbon Fuel as Coolant under Supercritical Pressures," Journal Aerospaced Engineering, Proceedings of the Institution of Mechanical Engineers, Part G, pp. 1-16, Aug. 22, 2011.

"Cross-Cutting Technologies," A Review of United States Air Force and Department of Defense Aerospace Propulsion Needs, pp. 203-215, 2006.

P. Bradshaw et al., "Turbulent Wall Jets with and without an External Stream," Reports and Memoranda No. 3252, June pp. 1-48,1960.

R. S. Bunker et al., "Gas Turbine Heat Transfer: Ten Remaining Hot Gas Path Challenges," Journal of Turbomachinery, Technology Review, vol. 129, pp. 193-201, Apr. 2007.

M.B. Glauert, "The Wall Jet," University of Manchester, pp. 625-643, Aug. 1956.

C.M. Hagg et al., Novel Carbon Polymer Electrodes for Battery Applications, Published in The Fourteenth Annual, Battery Conference on Applications and Advances, IEEE, pp. 349-354, Jan. 12-15, 1999.

D.R. Kirk et al., Gas Turbine Engine Durability Impacts of High Fuel-Air Ratio Combustors—Part II: Near-Wall Reaction Effects on Film-Cooled Heat Transfer, Journal of Engineering for Gas Turbines and Power, vol. 125, pp. 751-759,Jul. 2003.

W.M. Roquemore et al., "Trapped Vortex Combustor Concept for Gas Turbine Engines," 2001 American Institute of Aeronautics & Astronautics, 39th AIAA Aerospace Sciences Meeting & Exhibit, pp. 1-16, Jan. 8-11, 2001.

Unofficial English Translation of Chinese Office Action issued in connection with corresponding CN Application No. 201210540580. 4, U.S. Appl. No. 13/328,704, Jul. 14, 2015.

Unofficial English Translation of Japanese Office Action issued in connection with corresponding JP Application No. 2012-269892 dated Sep. 13, 2016.

* cited by examiner

HYDROCARBON FILM PROTECTED REFRACTORY CARBIDE COMPONENTS AND USE

RELATED APPLICATIONS

This application is a divisional of U.S. patent application Ser. No. 13/328,704, filed 16 Dec. 2011, which is herein incorporated by reference.

BACKGROUND

This disclosure relates, in general, to methods for stabilizing refractory carbides in a high temperature combustion-gas environment.

Current gas turbine performance, whether for land, sea or air uses, is limited by the allowable hot-section material temperature and the cooling penalty required to maintain the integrity of those materials. In conventional turbine systems, for instance, compressor discharge air may be used as a coolant for hot gas path components. The "hot gas path" of these turbine systems includes components such as the combustor liners and flame holding segments, stationary vanes and rotating blades of a high-pressure turbine stage, and the shrouds around the rotating blades. Composite and monolithic materials have been under development for many years to provide higher temperature capabilities of these hot gas path components, leading to higher firing temperatures and engine efficiencies. Refractory carbides, such as refractory metal carbides (MCs) and ceramic matrix composites (CMCs) are such materials. Refractory carbides have extremely high melting points. Ceramic matrix composites (CMCs) consist commonly of continuous SiC reinforcing fibers within a matrix of SiC—Si, which is made using a molten silicon infiltration process. The desirable properties of CMCs include high thermal conductivity, high matrix cracking stress, high inter-laminar strengths, and good environmental stability. Though CMCs offer higher temperature capability, up to at least 2800° F., they are still limited by environmental factors that require specialized coatings and cooling. In particular, for temperatures above 2200° F., uncoated CMCs suffer from excessive oxidation and recession. Currently, CMCs utilize an environmental bond coat (EBC) based on mullite and Ba—Sr-aluminosilicate ceramic chemistries. The EBC prevents the CMC material from loss due to recession, though with associated concerns over damage or loss of the coating.

All conventional gas turbine engines employ separate combustion systems and turbines that must be in close proximity with the combustors. The design and operability of the combustor, whether of diffusion, premixed, or combined modes, gas or liquid fuels, has great influence on the thermal management of the turbine. In addition, the thermal management of the combustor system itself can significantly contribute to the resulting gas temperature profile and pattern factors, combustion instabilities, and emissions. With the technology shift to lower emissions and zero emissions engines, new combustion strategies demand innovations in combustor and turbine structure. Additionally, there is a need for systems and methods for operations which allow for increased temperature operation while maintaining integrity and performance of the turbine components.

SUMMARY

This disclosure is generally directed to a system and method of stabilizing hot gas path components with a high carbon activity gas. More particularly, the disclosure is in the field of gas turbine power generation systems.

In one embodiment, the disclosure relates to a method for stabilizing a refractory carbide hot gas path component. In this method, fuel is combusted in a combustor. A high carbon activity gas is delivered to at least a portion of a component of a hot gas path that is thermally coupled to the hot gas path. At least a portion of a hot gas path component comprises refractory carbide.

In one embodiment, the disclosure relates to a turbine power generation system. The system comprises a number of hot gas path components that are thermally coupled to a hot gas path. At least a portion of at least one of the hot gas path components comprises refractory carbide or ceramic matrix composite (CMC). A combustor is configured to combust a mixture of air with a fuel to produce an exhaust gas stream. A turbine is configured to convert energy of this exhaust stream into useful mechanical energy. A high carbon activity gas is delivered by a conduit to at least one of the hot gas path components.

In one embodiment, the disclosure relates to a cooling system for a hot gas path component. This system includes a hot gas path component and a first conduit that delivers a high carbon activity gas to at least a portion of the hot gas path component. This high carbon activity gas forms a film of cover gas on a surface of at least one hot gas path component. For purposes of this disclosure, "a surface" can refer to any surface of a hot gas path component, including internal or external surfaces.

The above described and other features are exemplified by the following detailed description and drawings.

BRIEF DESCRIPTION OF THE DRAWINGS

These and other features, aspects, and advantages of the present system will become better understood when the following detailed description is read with reference to the accompanying drawings in which like characters represent like parts throughout the drawings, wherein.

DETAILED DESCRIPTION

Figure 1:
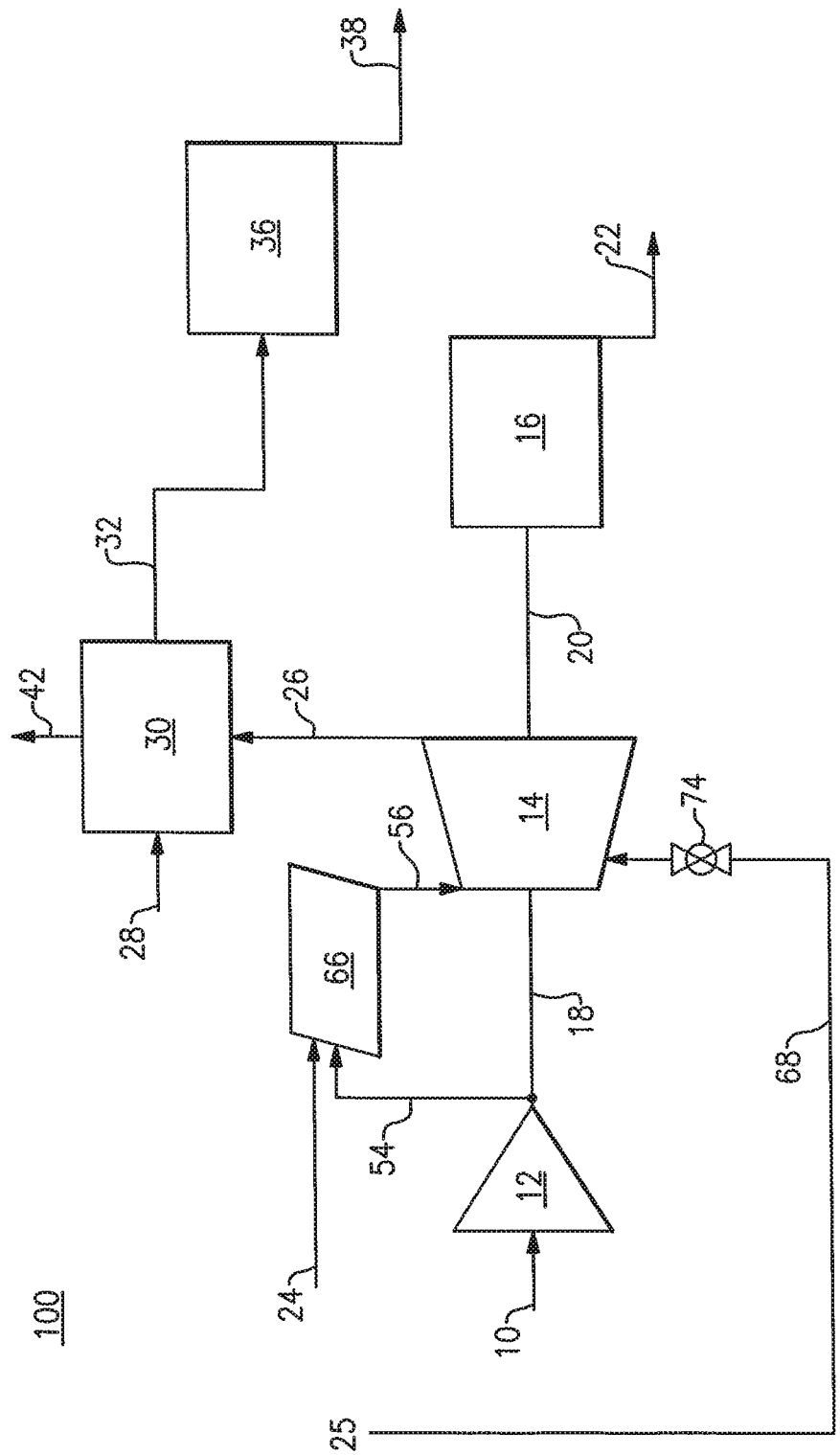
FIG. 1 is a process flow diagram of a turbine power generating system, which is adapted to utilize a high carbon activity gas as a turbine component stabilization source according to one embodiment.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

This disclosure utilizes a refractory carbide material and system to create a hot gas path component that is capable of withstanding at least about 3000° F. according to one example. In this disclosure, the oxidation and volatilization of turbine hot gas path components are suppressed by introducing a continuously renewed, chemically stabilizing film of high carbon activity gases on a surface of the hot gas path components. These gases provide stabilization of the refractory carbide, whether that is on the exterior surfaces or on the interior surfaces. Here, the high carbon activity gas is provided to at least a portion of a surface of a hot gas path component, and specifically a portion that is comprised of a refractory carbide, to protect it from post-combustion gases. This protective layer functions to minimize recession of the carbide.

The disclosure allows for refractory carbides to be used at extremely high temperatures, which in one example is >3000° F. Other temperature ranges are also accommodated with the refractory carbides. Carbides for use in the hot gas path components will possess high melting points and will have structural stability and strength at high temperatures. Examples of such refractory carbides include, but are not limited to, TiC, ZrC, HfC, TaC, SiC, NbC and $B_4C$. For purposes of this disclosure, the terms "refractory carbide", "refractory metal carbide" and "ceramic matrix composite" may be used interchangeably with the terms applicable to both the matrix and reinforcing component. While silicon carbide-based CMCs are described in the examples herein, the person of skill will realize that other refractory carbide composites, as well as monoliths, that possess similar properties may be used. Oxides would not be suitable for use in the methods and systems described herein.

Carbon activity is a thermodynamic ratio of carbon partial pressure in an environment as compared to the standard state carbon activity of 1.0 in graphite. High carbon activity gases, therefore, are those in which the partial pressure of carbon in a gas is higher than the activity of carbon in the refractory carbide at the component's surface. For purposes of this disclosure, the actual value for the carbon activity is between about 0.1 and about 1.0.

The person of skill will appreciate that, while the description below is illustrative of a gas turbine system, any system utilizing refractory carbide components that can be oxidized and recessed during a firing process could utilize embodiments of this disclosure. Jet engines, land-based turbines, or rocket nozzles, afterburners or motors are exemplary of such alternative systems. The methods and systems of the disclosure are useful for power generating turbines, aero-derivative engines, and marine propulsion engines.

FIG. 1 illustrates a turbine power generating system 100 utilizing a high carbon activity gas 25 that stabilizes the hot gas path components of the turbine. The turbine power generating system includes an air compressor 12, a combustor 66, a turbine 14, and an electrical generator 16. The compressor 12, the turbine 14, and the electrical generator 16 may be linked by two shafts 18 and 20. It should be noted that the shafts 18 and 20 may also be the same shaft. The shaft(s) allows the mechanical energy produced by the turbine 14 to be utilized by the generator 16 and the compressor 12.

The air 10 entering at an inlet of the air compressor 12 is compressed. The compressed air 54 leaving an outlet of the air compressor 12 may then be supplied to a combustor 66; various combustor embodiments that may be utilized are described in detail below.

In certain embodiments, it may be advantageous to have complete coverage of the hot gas path component, while in other embodiments, lesser coverage may be desired. The availability of different combustor systems and a control valve on the mixing chamber allows for control of the high carbon activity gas injection rates.

Current turbine film cooling relies entirely on the use of rows of discrete film holes oriented at shallow angles to the surface. The effective design and location of these film rows can lead to full coverage protective gas layers. In combustors today, it is common to use multihole, full coverage film cooling, or other forms of complete slot type film cooling to achieve the objective. Hence, the technology does exist to introduce the high carbon activity protective layer over a full hot gas path component. Challenges do still exist in providing sufficient coverage in extreme geometry regions such as airfoil trailing edges, blade tips, and interfacial slots between components, as well as highly turbulent flow streams. For such regions, engineered versions of transpiration cooling similar to that obtained for a porous wall can be used.

The allocation of gases and film coverage can be tailored to various degrees and locations to benefit optimized work extraction and engine efficiency. The method can be used to augment combustion in a system, for example by using a high carbon activity gas protected vane and/or blade downstream of a conventional combustor, or as the combustor only, or as combustor and vane system, or as a distributed combustion system through several components.

A variety of further embodiments of the combustion system may be used for purposes of this disclosure. Aviation engines typically use annular combustors, while land-based power turbine engines use can-annular combustors. Advanced aircraft engine combustor-turbine systems may already experience a certain level of burning around the nozzle guide vanes. Airfoil film cooling can react with unburned fuel to create film heating near the surfaces of the hot gas path. Some combustion systems seek the merging of the combustor and the turbine inlet guide vane into a single system. Such a combined combustor and turbine inlet guide nozzle injects fuel on the surface of the nozzle. The fuel cools the nozzle, and combustion occurs downstream of the nozzle. For example, staged combustors may introduce a primary combustion zone upstream and a secondary combustion zone just ahead of, or into, the turbine inlet vanes. Trapped vortex combustion (TVC) is a form of staged combustion that employs a recirculation wall cavity as the pilot burner. The TVC device creates a flame stabilization zone providing continuous sources of ignition by mixing hot products and burning gases with the incoming fuel.

A conventional combustor followed by a CMC3000 vane (CMC with protective film) may be used in which the CMC is protected by the high carbon activity gas, thereby eliminating all compressor discharge air from the vane. This system allows a higher firing temperature, or current firing temperatures with lower flame temperatures (lower emissions). The high activity carbon gas augments the combustor system to provide a more staged system, as described in the example below.

In one non-limiting example, the conventional combustor and turbine inlet guide vane may be replaced by a CMC Coanda nozzle, such as described in U.S. Patent Publication Numbers US 20080134685 and US 20080078181. This new system achieves both functions of a combustor and an inlet guide vane while being made of CMC. Briefly, in this combustor, fuel is injected in a controlled pattern tangential to a curvilinear wall with the Coanda effect causing the jets to stick to the surface. In applications using gaseous fuel, $CH_4$, for instance, may be both the main fuel injection and the protective gas for the CMC. In applications using liquid fuel, such as jet fuel, the hydrocarbon fuel would be atomized inside the CMC components, then used as injected gaseous fuel to form the CMC protective layer. In both applications, combustion may occur both through the aero flow passage and downstream of the nozzle.

Those that are skilled in the art will know that in some cases it may be desirable to preheat the compressed air 54 in a recuperator before feeding the compressed air 54 to the combustor 66. The fuel 24 is also supplied to the combustor 66. The flow of the fuel may be controlled by a flow control valve. The fuel may be injected into the combustor 66 by an injection nozzle. For high pressure gas turbine applications, it is also advantageous to utilize multiple combustion chambers, or cans, circumferentially situated about the rotational axis of turbine to combust the fuel 24 and the compressed air 54.

Inside the combustor 66, the fuel 24 and the compressed air 54 are mixed and ignited by an igniter to produce an exothermic reaction. After combustion, the hot, expanding gases 56 resulting from the combustion are directed to an inlet nozzle of the turbine 14. When expanded through the turbine 14, the hot gases create turbine shaft power. The turbine power, in turn, drives the air compressor 12. Turbine exhaust gas 26 exits the turbine.

In some embodiments, the turbine exhaust gas 26 may be fed to a steam generator 30. In recuperated systems, the turbine exhaust gas 26 may first be fed through the recuperator to heat the combustion air before the exhaust gas is transmitted to additional heat recovery stages. The turbine exhaust gas 26 fed to the steam generator 30 is used to heat water 28 and produce steam 32. The steam 32 is fed to the steam generator 36, which may be a steam turbine powered generator, to produce additional electric power 38.

In order to allow the combustor 66 to fire at higher temperatures, high carbon activity gas 25 is supplied via a first conduit 68 to the hot gas path to cool and/or protect the hot gas path components of the turbine system 100. In some embodiments, a regulator 74, such as a valve or a gland seal, may be present to selectively control the amount of the high carbon activity gas distributed to the hot gas path.

The high carbon activity gas may be the same fuel 24 as discussed earlier, but may alternatively come from a separate source. Fluid hydrocarbon fuels such as, but not limited to, methane, naphtha, butane, gasoline, jet fuel, biofuel or natural gas would be appropriate for this use. In some embodiments, the high carbon activity gas is delivered to the hot gas path components as a spray or in a gasified form. As used herein, the term "hot gas path components" generally refers to hardware components which are exposed to the hot gases produced by the combustor 66. These hot gas path components may be stationary or rotating. Examples of such hot gas path components include, but are not limited to, a combustor (including a combustor component, for instance, a combustor liner or a flame holding segment), a shroud, a vane or a blade of a turbine, a rocket, a ram jet or a scram jet.

The high carbon activity gas 25 may be delivered anywhere in the turbine system 100 that allows for sufficient cooling and/or protection of a hot gas path component. As a non-limiting example, the figure shows the high carbon activity gas 25 being delivered directly to the turbine 14. Alternatively, the high carbon activity gas 25 may be delivered to the combustor 66 or the shaft 20 where it may be distributed throughout the turbine 14. The high carbon activity gas 25 could, in some embodiments, be mixed with air from the compressor 12 to form a coolant. In other embodiments, the high carbon activity gas 25 could protect a portion of the turbine 14 while compressor extraction air cools another portion (whether metal or CMC).

In some embodiments, the rotating blades in the turbine may be replaced. Here, the high carbon activity gas would be used in CMC blades, completely eliminating the chargeable air from the blades. The resulting rotational combustor system would produce a well-mixed high temperature gas for subsequent turbine stages. Use of fuels as the high carbon activity gas will lead to subsequent further combustion, unlike the use of $CO_2$ or other non-reacting gas alone. The high carbon activity gases may, in some cases, react with certain phases of the refractory carbide; however, in many cases these gases will mix and react downstream or away from the refractory carbide surface.

The turbine power may also drive an electrical generator 16. The electrical generator 16 uses the mechanical energy to produce electric power 22. The present invention could also be configured without the electrical generator 16. Turbine power would be transmitted and applied directly, as in the case of a mechanically driven application.

Figure 2:
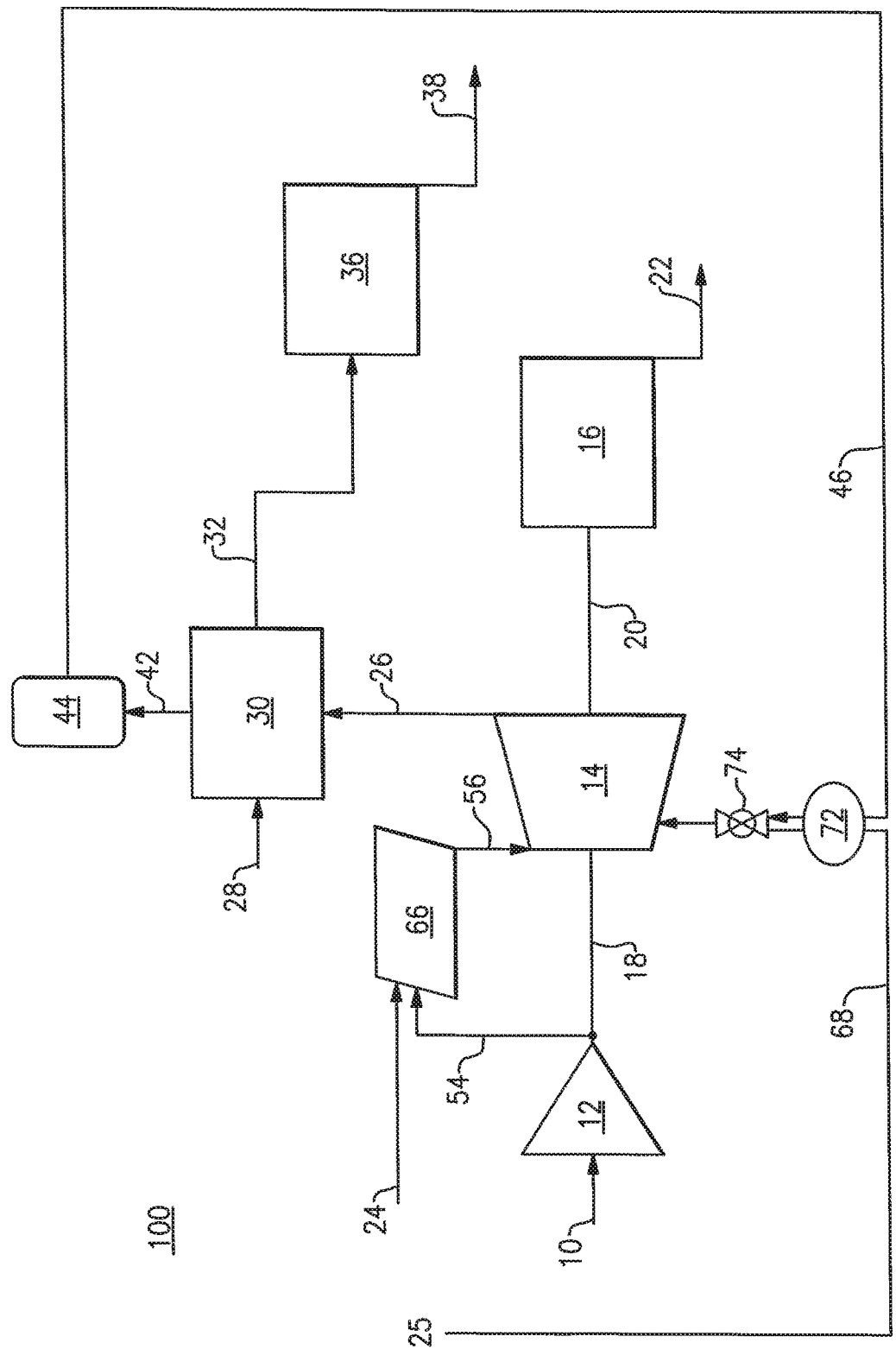
FIG. 2 is a process flow diagram of a turbine power generating system, which is adapted to utilize a high carbon activity gas including sequestered carbon dioxide as a turbine component stabilization source according to one embodiment.

Under certain conditions, it may be desirable to mix the high carbon activity gas with carbon dioxide prior to delivery to the hot gas path. FIG. 2 illustrates a turbine power generating system utilizing a high carbon activity gas 25 mixed with carbon dioxide. In this embodiment, high carbon activity gas 25 is carried through a first conduit 68 to a mixing chamber 72. Carbon dioxide is supplied from a source via a second conduit 46 to the mixing chamber 72. The mixing chamber 72 need not be a separate component as illustrated in the figure, but may be a confluence of the second conduit 46 and the first conduit 68, as long as carbon dioxide can be mixed together with the high carbon activity gas 25.

In some embodiments, a valve (not shown) may be present to selectively control the amount of the carbon dioxide and the amount of high carbon activity gas that is to be mixed and distributed to the hot gas path. This valve allows for varying the concentration of the high carbon activity gas and/or carbon dioxide delivered to the hot gas path components.

In some embodiments, the carbon dioxide may be removed from the cooled exhaust gas 42 and optionally stored in a reservoir 44, as shown. Carbon dioxide may be removed from the exhaust gas 42 using many different processes. For example, membrane separators or carbon dioxide scrubbers may be used to filter or otherwise separate carbon dioxide from the exhaust gas stream. Because the present method and system may be employed with any carbon dioxide sequestration process, further discussion of carbon dioxide sequestration methods is not provided herein.

Several advantages may be realized by adding sequestered carbon dioxide in high carbon activity gas 25. In some instances, the gas turbine engine would no longer need to use compressor bypass air for cooling. As such, all compressor air may then be fed to the combustor. This allows (1) a smaller compressor to be used to reduce "parasitic" energy losses incurred when turning the compressor, and/or (2) more air to be fed to the combustor to produce more powerful combustion. Both of these changes would improve output and efficiency. Also, in some instances, adding sequestered carbon dioxide may increase the total mass flow of the turbine. This further increases the output of the gas turbine engine. This increase in power would help offset the energy cost of moving the carbon dioxide. Even though the carbon dioxide must be compressed prior to its introduction into the hot gas path, a system such as the one described that allows for a use of the sequestered carbon dioxide may be desirable under the proper conditions.

Figure 3:
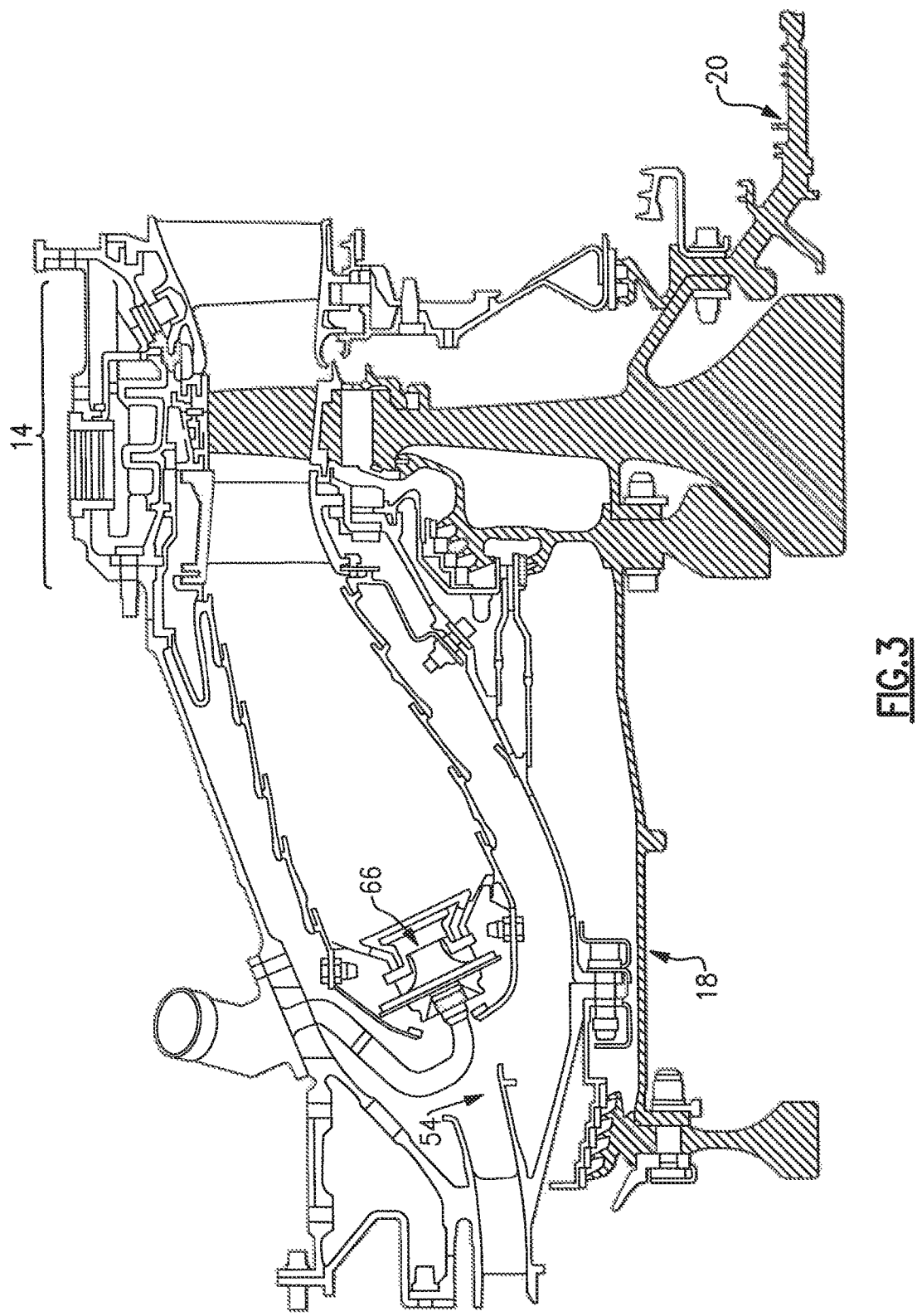
FIG. 3 illustrates a schematic diagram of an example of an aviation high-pressure gas turbine and combustor in one embodiment.

FIG. 3 illustrates a schematic diagram of an example of a conventional aviation high-pressure gas turbine and combustor in one embodiment.

The chemical activity of carbon required to stabilize refractory carbides, such as SiC for a currently utilized CMC system, is established by injecting a protective hydrocarbon gas to the hot gas path component, forming a protective layer on a surface of the component. This hydrocarbon layer must do three things in order to effectively protect the hot gas path component. The first is to exclude water vapor. Without being held to any one theory, it is believed that this action is accomplished by limiting the diffusion of water vapor through the protective layer. Additionally, it is believed that the layer reacts with available $H_2O$ to reduce the $H_2O$ effective vapor pressure at the surface of the metal carbide component. The second function of the protective layer is to reduce the partial pressure of $O_2$ in order to limit the rate of direct oxidation of the metal carbide. If and when an oxide species finds its way into the protective layer, either from the combustion gas or as an addition, it must be reduced to limit the rate of oxidation at very high temperature. The $O_2$ potential needed for this is a function of both the refractory carbide of interest as well as temperature. Once these two functions are accomplished, the third purpose of the film is to maintain the carbon activity at a high enough level to minimize the evaporation of the refractory carbide and thus stabilize it. Finally, as the high carbon activity gas will typically be supplied at a much lower temperature than the combustion gases, it may provide cooling to the hot gas path component, both as internal cooling and film cooling, allowing much higher firing temperatures. However, it is not necessarily the case that the refractory carbide be kept at a lower temperature than the combustion gases, provided that the MC is fully stabilized.

A system that utilizes nitrogen as a cover gas may exclude water vapor successfully. However, nitrogen in practice could not be made with low enough oxygen content to prevent direct oxidation, which is an issue at temperatures greater than 2500° F. The $SiO_2$ can dissociate and evaporate given the increase in SiO vapor pressure, and the viscosity of the $SiO_2$ glass which forms on the CMC decreases to the point that the once-protective oxide would be removed. Furthermore, not all MC oxides are protective. These may evaporate or spall once formed. In these cases the oxygen content of the cover gas must be kept low enough to limit substantial direct oxidation even with the exclusion of water vapor.

In one example, combusted gas product ($CO_2$) is reintroduced to the hot section components after mixing with a hydrocarbon, e.g. methane or jet fuel, to adjust the carbon potential in the gas. For a SiC based CMC material without coatings, the $CO_2$ can oxidize SiC according to Eq. 1 a.):

$$SiC + CO_2 \rightarrow SiO_2 + 2C \quad \text{1 a.)}$$

With the Law of Mass Action however, at high carbon activity or low $CO_2$ pressure, the reaction of Eq. 1 a.) is driven to the left and SiC is stable. These conditions put limits on the acceptable ranges for both carbon activity and $CO_2$ partial pressure.

If $SiO_2$ does form, it reacts with $H_2O$ vapor according to Eq. 1 b.) below resulting in recession and consumption of the CMC:

$$SiO_2 + 2H_2O \rightarrow Si(OH)_4 \quad \text{1 b.)}$$

Combining Eq 1a.) and 1 b.) and representing the carbon-containing species as $CH_4$ for example, gives the overall Eq 2.:

$$SiC + 4H_2O \rightarrow Si(OH)_4 + CH_4 \quad \text{2.)}$$

This shows that water in the air, or the post-combustion gases, leads to evaporation of the SiC and production of methane ($CH_4$). If a protective layer on the surface of the refractory carbide is high in carbon chemical activity, such as with $CH_4$ content, then this reaction can be driven to the left, suppressing the consumption of the SiC. Likewise, the direct sublimation of SiC proceeds according to Eq. 3.):

$$SiC(s) \rightarrow SiC(g) \rightarrow Si(g) + C \quad \text{3.)}$$

in which gaseous Si is produced with carbon. Again, the provision of a high carbon chemical activity can drive this reaction to the left, directly suppressing the evaporation of the SiC.

According to this chemical stability scenario, if the refractory carbide can be completely and efficiently covered by a layer of high carbon activity gas, then the refractory carbide will withstand high temperatures such as 3000° F. temperatures without loss or degradation of material. Further, a refractory carbide system with injection of a high carbon activity gas, with full coverage of the surface by these gases, allows full protection of the surfaces even with combustion of the fuel in the mainstream flow rather than only downstream. This system will result in hydrocarbon stabilization of the refractory carbide components.

Refractory carbide components currently require environmental barrier coatings (EBCs) to avoid oxidation and recession. However, in this present system, no environmental coatings are required, thereby eliminating one source of possible system failure or degradation. Using stand alone carbide components without EBC has many benefits. 1.) EBCs are prime reliant, i.e. the life of the component is limited by the life of the EBC. Use of high carbon activity gas in place of EBCs extends life to that inherent of the mechanical durability of the carbide component and not the life of the EBC. 2.) Manufacturing and materials costs are greatly reduced by eliminating EBCs. EBCs require multiple deposition steps to produce all the layers comprising the coating. These processes add not only materials and labor costs but also the need for investing in high-cost manufacturing equipment. 3.) EBCs add significant weight to a coated component. For aviation applications in particular, improved performance and reduced fuel consumption would result in the use of cover gases in lieu of EBCs. The use of an uncoated refractory carbide component with a continuously renewed vapor chemical protective film presents an opportunity for a 3000° F. capable material that may be protected using a hydrocarbon vapor source (e.g., fuel). Provision of such turbine components could lead to completely new engine architectures in which both non-chargeable and chargeable air cooling flows are nearly eliminated with consequent increases in engine efficiency and specific fuel consumption (SFC) of several points.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A turbine power generation system, comprising:
a plurality of hot gas path components comprising a combustor and a turbine, said combustor configured to combust a mixture of air with a fuel to produce an exhaust gas stream, and said turbine configured to convert energy of said exhaust stream into useful mechanical energy; and
wherein said plurality of hot gas path components is thermally coupled to a hot gas path; and
a first conduit configured to deliver a high carbon activity gas to at least one hot gas path component of said plurality of hot gas path components, wherein the at least one hot gas path component comprises a plurality of film holes disposed to cover at least a portion of the at least one hot gas component with a layer of the high carbon activity gas, and wherein delivering the high carbon activity gas comprises introducing the high carbon activity gas via the plurality of film holes;
wherein a refractory carbide comprises at least a portion of said plurality of hot gas path components.

2. The turbine power generation system according to claim 1, further comprising a valve configured to selectively control an amount of said high carbon activity gas delivered to said at least one hot gas path component of said plurality of hot gas path components.

3. The turbine power generation system according to claim 1, wherein said combustor comprises a Coanda nozzle.

4. The turbine power generation system according to claim 1, further comprising at least one of:
a compressor configured to compress air;
a generator configured to convert mechanical energy produced by said turbine into electrical energy; and
a shaft linking said compressor, said turbine, and said generator to allow mechanical energy produced by said turbine to be utilized by said generator and said compressor.

5. The turbine power generation system according to claim 1, wherein said refractory carbide comprises a ceramic matrix composite.

6. The turbine power generation system according to claim 1, wherein the layer of the high carbon activity gas is on an exterior surface or an interior surface of the at least one hot gas path component.

7. The turbine power generation system according to claim 1, wherein the refractory carbide is selected from the group consisting of: TiC, ZrC, HfC, TaC, SiC, NbC and $B_4C$.

8. The turbine power generation system according to claim 1, wherein the high carbon activity gas comprises fluid hydrocarbon fuel.

9. The turbine power generation system according to claim 8, wherein the fluid hydrocarbon fuel is selected from the group consisting of: methane, naphtha, butane, gasoline, jet fuel, biofuel and natural gas.

10. The turbine power generation system according to claim 1, wherein the high carbon activity gas is delivered to the turbine.

11. The turbine power generation system according to claim 1, wherein the high carbon activity gas is delivered to the combustor.

12. A cooling system for a hot gas path component, said cooling system comprising: the hot gas path component comprising a plurality of film holes disposed to cover at least a portion of the hot gas path component with a layer of a high carbon activity gas; and a first conduit configured to deliver the high carbon activity gas to said hot gas path component by introducing the high carbon activity gas via the plurality of film holes, wherein said high carbon activity gas forms a film of cover gas on a surface of said hot gas path component, wherein said hot gas path component comprises a refractory carbide.

13. The cooling system according to claim 12, wherein said hot gas path component is selected from a combustor, a vane, a blade, a rocket, a ramjet, a scram jet and a shroud.

14. The cooling system according to claim 13, wherein said hot gas path component is a combustor and the combuster comprises a Coanda nozzle.

15. The cooling system according to claim 12, wherein the refractory carbide comprises a ceramic matrix composite.

16. The cooling system according to claim 12, wherein the refractory carbide is selected from the group consisting of: TiC, ZrC, HfC, TaC, SiC, NbC and $B_4C$.

17. The cooling system according to claim 12, wherein the high carbon activity gas comprises fluid hydrocarbon fuel.

18. The cooling system according to claim 17, wherein the fluid hydrocarbon fuel is selected from the group consisting of: methane, naphtha, butane, gasoline, jet fuel, biofuel and natural gas.

19. The cooling system according to claim 12, wherein the high carbon activity gas is mixed with air.

* * * * *